INVENTORS
WILBUR E. HARRIS
JOHN E. CADY
BY
Irwin M. Lewis
ATTORNEY

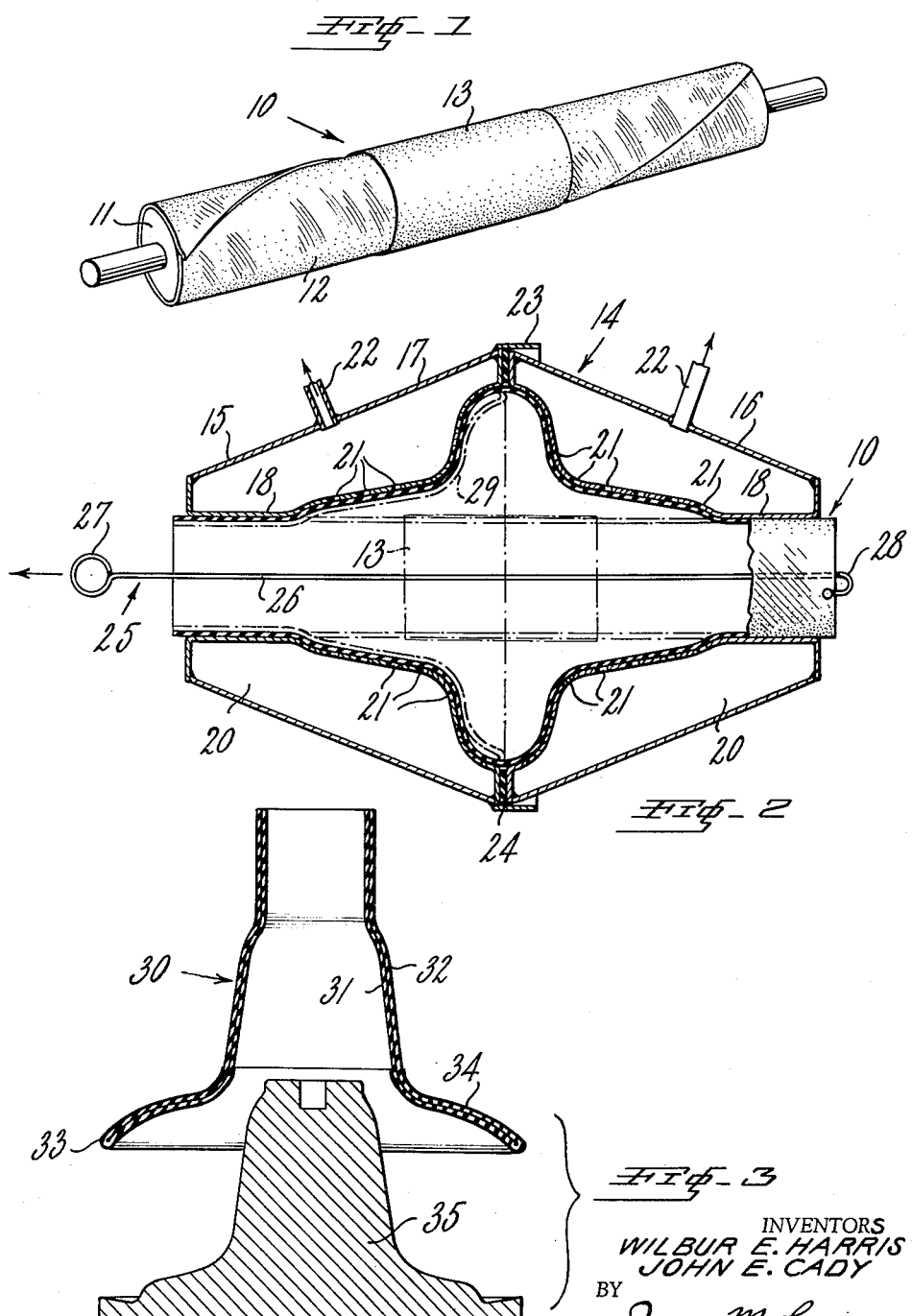

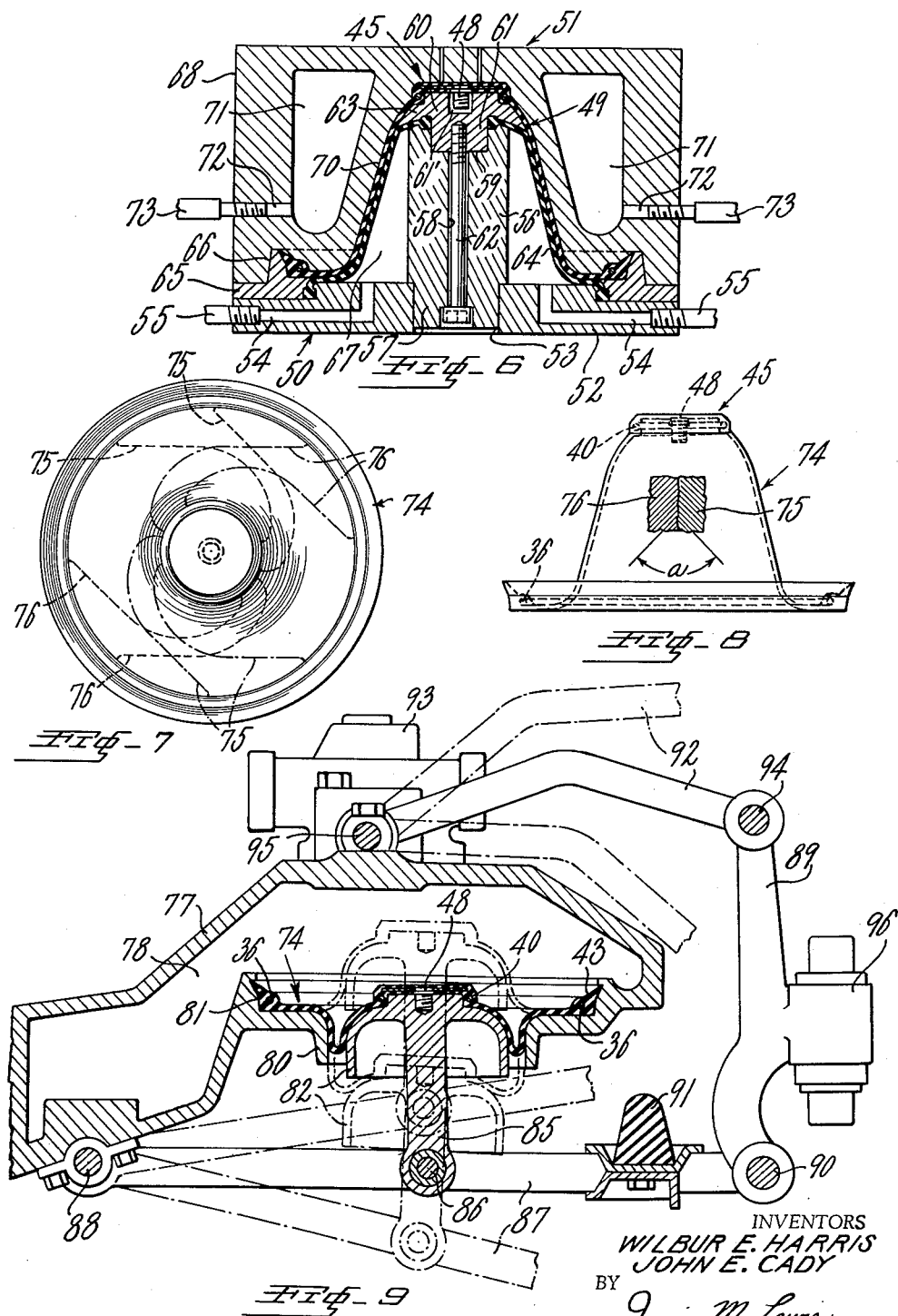

United States Patent Office 3,013,920
Patented Dec. 19, 1961

3,013,920
METHOD OF MAKING A FLEXIBLE DIAPHRAGM FOR USE IN FLUID SPRINGS
Wilbur E. Harris and John E. Cady, Indianapolis, Ind., assignors to United States Rubber Company, New York, N.Y., a corporation of New Jersey
Filed Mar. 1, 1957, Ser. No. 643,297
7 Claims. (Cl. 156—194)

This invention relates generally to the art of making flexible diaphragms for use in fluid springs and the like.

The diaphragm of this invention is useful in various environments and is especially useful as an element of a fluid spring of the controlled area type which includes a cylinder, a piston and a flexible diaphragm which connects the piston to the cylinder. In this type of spring, the diaphragm is turned inside out in the course of a full stroke of the piston and, as a consequence, may be pinched between the piston and the cylinder and thereby damaged unless adequate restraint is provided to prevent excessive relative lateral movement between the piston and the cylinder.

The present invention constitutes an improvement over that disclosed in pending application of D. R. Elliott et al., Serial No. 495,534, filed March 21, 1955, and entitled "Fluid Spring," now Patent No. 2,901,242. As will be evident to persons skilled in the art from the ensuing detailed description and the accompanying drawings, the present invention embodies a number of novel features that contribute to its utility in practice. It should be borne in mind that this invention is concerned with diaphragms for use in fluid springs of the character disclosed in said D. R. Elliott et al. application.

It is the principal object of this invention to provide an improved method of making a diaphragm of the character indicated.

A preferred and recommended diaphragm of this invention comprises a flexible, generally tubular, cup-shaped member having one end of substantially greater circumference than the other end. The member is made from a single piece of cord fabric that is coated with a flexible fluid-impermeable composition, such as rubber, and that is formed and folded intermediate its ends in a manner to obtain two relatively superposed, substantially coextensive and coaxial tubular plies. The cords of the member are substantially inextensible. Each end of the member is provided with an annular bead portion which is secured to a corresponding bead wire bundle or solid metal bead wire. The end of the member of greater circumference is also provided with a continuous outwardly projecting lip of a resilient compressible composition, such as rubber.

In making the diaphragm, the strip of cord fabric is wound along a substantially helical path about a mandrel to thereby obtain a flexible, substantially right circular cylindrical tubular unit in which the individual cords of the fabric form an angle of between 15° and 75° with a plane that is normal to the axis of the unit. It has been ascertained that this angle, for best results, should be between 40° and 55°. The tubular unit is expanded and flared intermediate its ends with the aid of a vacuum device. One end of the thus flared unit is then drawn along the remainder thereof, i.e., turned outside in, to obtain the two relatively superposed, substantially coextensive and coaxial plies. The individual cords of one of the plies extend across the individual cords of the other ply at an angle of between 30° and 150°. This angle preferably is between 70° and 100°.

The two ply member is next shaped on a form and is equipped with the bead wire bundles or solid metal bead wires and the outwardly extending resilient lip at its end of greater circumference. The tubular member is then placed in apparatus, which will be described in detail further along in this description, wherein it is molded and cured.

The enumerated objects and other objects, together with advantages of this invention will be readily comprehended from the following detailed description taken in conjunction with the annexed drawings which describe and illustrate a preferred embodiment of the invention.

In the drawings:

FIG. 1 is an isometric view of a tubular unit formed on a mandrel from a strip of flexible bias-cut cord fabric and with a strip of an uncured gum ply extending around the central portion of the unit;

FIG. 2 is a central longitudinal cross sectional view of the tubular unit of FIG. 1 in association with a vacuum device for expanding the unit intermediate its ends, the tubular unit being partly shown in long dash-dot lines prior to being expanded and in full lines after being expanded;

FIG. 3 is an elevation view of a wooden building form for receiving and shaping the tubular unit of FIG. 2 after the latter has been expanded and drawn partly through itself;

Figure 4:
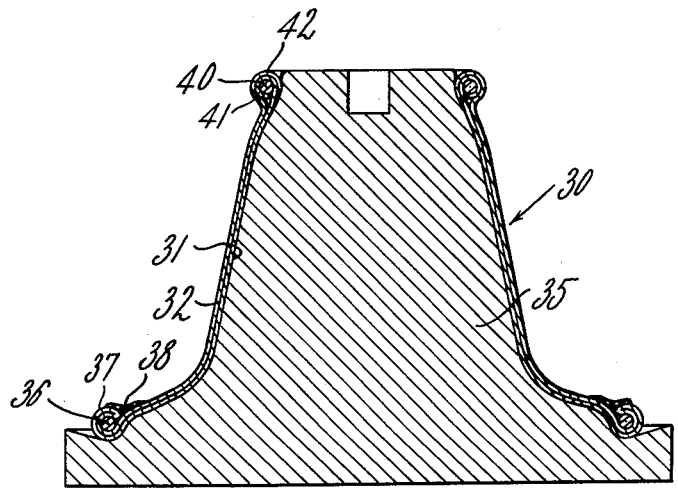
FIG. 4 is a view similar to FIG. 3 and illustrates an uncured diaphragm of this invention on the wooden building form and with bead wire bundles or solid metal bead wires at its ends.
Figure 5:
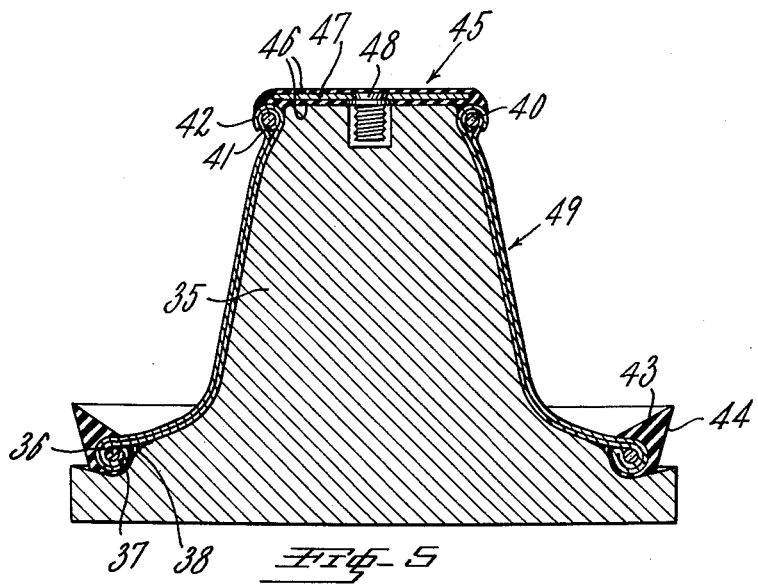

FIG. 5 corresponds to and shows the diaphragm of FIG. 4 turned inside out and having rubber elements secured to its ends;

FIG. 6 is a central vertical cross sectional view of apparatus for molding and curing the diaphragm of FIG. 5, and illustrates the relative position of the parts and diaphragm during the curing step;

FIG. 7 is a top plan view of the diaphragm of FIGS. 5 and 6, after curing, and shows in broken lines and in dot-dash lines a few of the cords of the fabric thereof to illustrate the directions they extend as incorporated in the diaphragm;

FIG. 8 is a view in elevation of the diaphragm of FIG. 7 with surface portions thereof broken away to better illustrate the cords of the fabric in the diaphragm; and FIG. 9 is a view partly in elevation and partly in vertical cross section and illustrates the spring diaphragm of this invention incorporated in a wheel suspension of an automobile, the medial or normal position of certain parts being shown in full lines and the maximum upwardly and downwardly deflected positions of such parts being shown in dot-dash lines.

Referring now to the drawings wherein like reference numerals denote corresponding parts throughout the several views, we have illustrated in FIG. 1 a substantially right circular cylindrical unit 10 that is formed on a mandrel or the like 11. Unit 10 is made from a first strip 12 of substantially weftless or weakened weft cord fabric of the type used in the manufacture of pneumatic tire casings. This strip may, if desired, be made of a braided fabric. The cords of the fabric may be of nylon, cotton, rayon, steel, glass or other relatively inextensible but flexible material. The cord fabric is coated, covered or otherwise provided with flexible, resilient, uncured rubber, either natural or synthetic, or other suitable flexible, resilient, plastic material which will render the fabric fluid-impermeable. The strip of cord fabric 12 is bias-cut and is disposed along a substantially helical path on mandrel 11 in making tubular unit 10. A second strip 13 of a flexible fluid-impermeable curable composition such as plain uncured rubber or other appropriate plastic material extends around and is adhesively secured to the outer surface of the cord fabric.

Strip 13 completes unit 10 and serves as a reinforcement sheath therefor.

Tubular unit 10 is expanded and flared intermediate its ends by means of a vacuum device 14 which includes a pair of hollow units 15 and 16. Unit 15 comprises a frusto-conical outer wall 17 and an inner wall 18 which defines an annular chamber 20 with the outer wall. Inner wall 18 has a plurality of perforations 21. The inner surface of wall 18 is so contoured as to determine the shape of the tubular unit after it is expanded and flared. A conduit 22 communicates with chamber 20 and is adapted to be connected to a vacuum-creating means (not shown). A circular flange 23 is welded or otherwise attached to the end of wall 17 of greater diameter and projects to the right thereof, as viewed in FIG. 2.

Unit 16 is identical with unit 15 except that it does not include a circular flange 23. A gasket 24 provides a fluid seal between the adjacent ends of the units. Units 15 and 16 are detachably connected by suitable coupling means (not shown) to permit of ready assembly and separation, as required.

In practice, vacuum device 14 is assembled and tubular unit 10 of FIG. 1 is positioned therein. Vacuum is simultaneously applied to both units 15 and 16 by way of conduits 22, causing the tubular unit to be expanded and flared from the dot-dash line configuration to the full line configuration, shown in FIG. 2. Due to the compositions of strips 12 and 13 of the tubular unit, the latter remains in the illustrated expanded and flared condition. On completion of expansion and flaring of the tubular unit, the vacuum is interrupted and the pressure in chambers 20 of units 15 and 16 is allowed to return to atmospheric.

The half of the expanded tubular unit at the right of FIG. 2 is then drawn through the remainder of the tubular unit, i.e., turned outside in, as indicated by corresponding dot-dash lines, by a tool 25. This tool consists of a rectilinear shank 26 having a handle 27 at one end and a hook 28 at the other end. The tool may be readily inserted in the tubular unit, engage an end of the tubular unit with hook 28 and then moved to the left as indicated by the arrow to draw half 29 of the expanded tubular unit outside in with respect to the remainder. Units 15 and 16 are next uncoupled and separated and the expanded and drawn tubular unit is removed from unit 15.

The tubular unit, after it is withdrawn from unit 15, is identified by numeral 30 in FIG. 3. It consists of flared and superposed outer and inner fabric plies 32 and 31, which are joined along a fold line 33 and covered at their ends of greater circumference by a layer 34 of rubber formed by strip 13 of FIG. 1.

Unit 30 is placed on a wooden building form 35 where it is shaped. A first bead wire or bead wire bundle 36 (FIG. 4) is placed on unit 30 and is secured thereto by forming an outwardly turned bead 37 from the lower end of the unit. A strip of plain uncured rubber 38 is applied along the bead to form an annular filler and cover therefor. A second bead wire or bead wire bundle 40 is secured to the upper end of the tubular unit by an outwardly turned bead 41 made of ply 31 and an inwardly turned bead 42 made of ply 32.

The beaded tubular unit is now removed from the building form (FIG. 4), is turned inside out, and is then replaced on the building form (FIG. 5). An extruded strip of uncured rubber or similar composition is applied to the lower bead of the unit of FIG. 5 to form a tapered annular lip 43 having an upwardly and outwardly extending peripheral surface 44. A cap 45 is applied to the upper end of the unit. This cap consists of a pair of discs 46 made of a flexible fluid-impermeable curable composition such as uncured rubber or similar composition, a plate 47 interposed between and bearing against the discs, and a threaded stud 48 which extends through a central opening in the plate and projects below the lower disc. The completed but uncured diaphragm is identified by numeral 49 in FIG. 5.

Diaphragm 49 is molded and cured by an arrangement of apparatus illustrated in FIG. 6. This apparatus consists of a lower unit 50 and an upper unit 51 which will now be described.

Lower unit 50 comprises a base plate 52 having a central opening 53 and a pair of L-shaped passages 54. A conduit 55 establishes communication between each passage 54 and a suitable source of compressed air or other fluid under pressure (not shown). A first block 56 has a stem 57 which registers with base plate opening 53. This block has a central vertical through opening 58 and a central top recess 59. A second block 60 has a stem 61 which registers with recess 59 and is provided with a top recess 61' for the reception of cap stud 48. This block is affixed to block 56 by a bolt 62 which extends through opening 58. Block 60 includes an annular flange 63 which has arcuate upper and lower surfaces, as illustrated. A tubular mold element 64 is clamped at its upper end between the upper surface of block 56 and the under surface of flange 63 and is retained in position due to the action of bolt 62. Mold element 64 is made of a suitable flexible material, such as cured rubber. A removable ring member 65 is provided with an integral upstanding circular flange 66. It will be observed that the ring member coacts with base plate 52 to engage and retain the lower end of mold element 64 in position. Base plate 52, block 56 and mold element 64 define an annular space 67 which is adapted to receive compressed air or other fluid by way of conduits 55 and passages 54. Compressed air so received in annular space 67 effects distention of the mold element to the extent allowed by associated parts of the apparatus.

Upper mold unit 51 comprises a hollow heat-conductive block 68 having an inner surface 70 which is so contoured as to conform to the outer configuration of diaphragm 49 when the latter is cured. This block is provided with a plurality of chambers 71 and passages 72 which establish communication between each chamber and the exterior of the block. A conduit 73 is adapted to transmit high temperature heating fluid, such as steam, from a steam generating means (not shown) into passages 72 and thence to chambers 71. The steam so transmitted into chambers 71 supplies heat to the apparatus to effect proper curing of the diaphragm.

The cured diaphragm is represented by numeral 74 in FIGS. 7, 8 and 9.

Referring to FIGS. 7 and 8, the plies of the cord fabric of the diaphragm are so arranged that the cords of both plies extend from one end of the diaphragm to the other with the individual cords 75 of one ply extending across the individual cords 76 of the other ply at an included angle $a$ (FIG. 8). This angle, as was explained earlier herein, may be within the range of 30° to 150° and, for best results in use, is between 70° and 100°. Expressed in terms commonly used in the pneumatic tire field and related fields, the cords of the plies alternately extend in different directions at a cord angle of between 15° and 75° and, for best results, between 40° and 55°. The expression "cord angle" is intended to mean the angle between the individual cords and a plane perpendicular to the surface of the plies and through a line tangential to and in the plane of a circumferential line of said surface.

Reference is next had to FIG. 9, which illustrates a fluid spring including a diaphragm of this invention incorporated in a wheel suspension of an automobile, the medial or normal position of certain parts of the suspension being shown in full lines and the maximum upwardly and downwardly deflected positions of such parts being shown in dot-dash lines. The illustrated wheel suspension comprises a hollow cross frame member 77 which defines a fluid chamber 78 that is adapted to be connected by a conduit (not shown) to a source of fluid supply under pressure (also not shown). Such fluid may be any suitable gas, or vapor, as desired. Integral with and forming a part of the cross frame member 77 is a cylinder 80. The term "cylinder" is used herein in its broad mechanical or functional sense to denote a member having an opening in which a piston may operate, and is not used in a strictly geometrical sense. Cylinder 80 is provided with an internal annular groove 81 that is so configured as to receive and retain the end of the diaphragm 74 which has bead wire bundle 36 and lip 43.

The other end of the diaphragm bears against the upper end of a piston 82 and is secured thereto by stud 48 which engages a blind tap in the piston. The piston has an integral depending rod 85 which is pivoted at 86 to a lower control arm 87. Control arm 87 is pivotally connected at one end to cross frame member 77 by a pin 88 and at its other end to a knuckle support link 89 by a pin 90. The control arm carries one or more resilient rubber bumpers 91 which engage the under surface of the cross frame member 77 to thereby limit counterclockwise pivotal movement of the control arm about its pin 88.

An upper support arm 92 is pivotally connected at its ends to knuckle support link 89 and to a shock absorber 93 by corresponding pins 94 and 95. It will be observed that arms 87 and 92 carry knuckle support link 89 which, in turn, carries a steering knuckle 96 of the automobile.

The medial or normal relative position of piston 82, diaphragm 74 and associated parts is shown in full lines in FIG. 9. The maximum upwardly and downwardly deflected relative positions of such parts are represented by corresponding dot-dash lines. It will be apparent from an examination of FIG. 9 that the diaphragm is turned inside out in the course of movement from its maximum downwardly deflected position to its maximum upwardly deflected position. The operation of the suspension shown in this view is believed to be evident from the drawing without additional description. The structure operates in the same manner as that disclosed in said pending D. R. Elliott et al. application to which reference may be had for further details, if desired.

From the foregoing, it is believed that the objects and advantages of the herein described method of making a diaphragm will be apparent to those skilled in the art, without further description. It is to be understood, however, that the invention may be embodied otherwise than as herein shown and described and that various changes may be made without departing from the spirit or sacrificing any of the advantages of the invention.

We claim:

1. A method of making a diaphragm comprising forming a single-ply, flexible cylindrical unit from a single strip of fabric coated with a flexible fluid-impermeable composition, expanding the central portion of said cylindrical unit to thereby flare the central portion outwardly, drawing one end of the unit through the remainder thereof to a position within the other end of said unit thereby forming a continuous fold line at the center of said flared central portion and obtaining a generally tubular diaphragm having a larger end at said fold line and a smaller end and having two superposed, substantially coextensive plies of fabric.

2. A method of making a diaphragm comprising helically winding a single strip of bias-cut cord fabric coated with a flexible fluid-impermeable composition to form a single-ply, flexible cylindrical unit, subjecting the central portion of said cylindrical unit to vacuum to thereby expand and flare the central portion outwardly, drawing one end of the unit through the remainder thereof to a position within the other end of said unit thereby forming a continuous fold line at the center of said flared central portion and obtaining a generally tubular diaphragm having a larger end at said fold line and a smaller end and having two superposed, substantially coextensive plies of cord fabric.

3. A method of making a diaphragm for use in a fluid spring comprising the steps of forming a single-ply, flexible cylindrical unit from a single strip of cord fabric coated with a flexible fluid-impermeable composition with the individual cord elements of the fabric disposed at a cord angle of between 15° and 75°, expanding the central portion of said cylindrical unit to thereby flare the central portion outwardly, drawing one end of the unit through the remainder thereof to a position within the other end of said unit thereby forming a continuous fold line at the center of said flared central portion and obtaining a generally tubular diaphragm having a larger end at said fold line and a smaller end and having two superposed, substantially coextensive plies of cord fabric, each of the cord elements of each ply extending from one end of said diaphragm to the other with the cord elements of one ply crossing those of the other ply at an included angle of between 30° and 150° and at a cord angle of between 15° and 75°.

4. A method of making a diaphragm for use in a fluid spring comprising helically winding a single strip of bias-cut cord fabric coated with a flexible fluid-impermeable composition to form a single-ply, flexible cylindrical unit in which the individual cord elements of the fabric are disposed at a cord angle of between 40° and 55°, subjecting the central portion of said cylindrical unit to vacuum to thereby expand and flare the central portion outwardly, drawing one end of the unit through the remainder thereof to a position within the other end of said unit thereby forming a continuous fold line at the center of said flared central portion and obtaining a generally tubular diaphragm having a larger end at said fold line and a smaller end and having two superposed, substantially coextensive plies of cord fabric, each of the cord elements of each ply extending from one end of said diaphragm to the other with the cord elements of one ply crossing those of the other ply at an included angle of between 70° and 100° and at a cord angle of between 40° and 55°.

5. A method of making a diaphragm for use in a fluid spring comprising the steps of helically winding a single strip of bias-cut cord fabric coated with a flexible fluid-impermeable curable composition to form a single-ply, flexible cylindrical unit in which the individual cord elements of the fabric are disposed at a cord angle of between 15° and 75°, forming a reinforcing sheath of a flexible fluid-impermeable curable composition around the outer surface of the center of said cylindrical unit, expanding the central portion of said cylindrical unit to thereby flare the central portion outwardly, drawing one end of the unit through the remainder thereof to a position within the other end of said unit thereby forming a continuous fold line at the center of said flared central portion and said reinforcing sheath and obtaining a generally tubular diaphragm having a larger end at said fold line and a smaller end, said larger end being covered on the exterior and interior thereof by said reinforcing sheath, and having two superposed, substantially coextensive plies of cord fabric, each of the cord elements of each ply extending from one end of said diaphragm to the other with the cord elements of one ply crossing those of the other ply at an included angle of between 30° and 150° and at a cord angle of between 15° and 75°, and molding and curing the product of the last preceding step.

6. A method of making a diaphragm for use in a fluid spring comprising the steps of helically winding a single strip of bias-cut cord fabric coated with a flexible fluid-impermeable curable composition to form a single-ply, flexible cylindrical unit in which the individual cord elements of the fabric are disposed at a cord angle of between 15° and 75°, expanding the central portion of said cylindrical unit to thereby flare the central portion outwardly, drawing one end of the unit through the remainder thereof to a position within the other end of said unit thereby forming a continuous fold line at the center of said flared central portion and obtaining a generally tubular diaphragm having a larger end at said fold line and a smaller end and having two superposed, substantially coextensive plies of cord fabric, each of the cord elements of each ply extending from one end of said diaphragm to the other with the cord elements of one ply crossing those of the other ply at an included angle of between 30° and 150° and at a cord angle of between 15° and 75°, closing the opening of the smaller end of the diaphragm with a cap comprising a flexible fluid-impermeable curable composition, and molding and curing the product of the last preceding step.

7. A method of making a diaphragm for use in a fluid spring comprising the steps of helically winding a single strip of bias-cut cord fabric coated with a flexible fluid-impermeable curable composition to form a single-ply, flexible cylindrical unit in which the individual cord elements of the fabric are disposed at a cord angle of between 15° and 75°, subjecting the central portion of said cylindrical unit to vacuum to thereby expand and flare the central portion outwardly, drawing one end of the unit through the remainder thereof to a positive within the other end of said unit thereby forming a continuous fold line at the center of said flared central portion and obtaining a generally tubular diaphragm having a larger end at said fold line and a smaller end and having two superposed, substantially coextensive plies of cord fabric, each of the cord elements of each ply extending from one end of said diaphragm to the other with the cord elements of one ply crossing those of the other ply at an included angle of between 30° and 150° and at a cord angle of between 15° and 75°, securing a substantially incompressible bead wire to the larger end of the diaphragm, forming a continuous outwardly projecting lip of a resilient compressible curable composition on the outer periphery of the larger end of the diaphragm, closing the opening of the smaller end of the diaphragm with a cap comprising a flexible fluid-impermeable curable composition, and molding and curing the product of the last preceding step.

References Cited in the file of this patent
UNITED STATES PATENTS

| | | |
|---|---|---|
| 1,610,173 | Slade | Dec. 7, 1926 |
| 1,711,207 | Van der Pyl | Apr. 30, 1929 |
| 1,737,874 | Busch | Dec. 3, 1929 |
| 2,033,354 | Pennington | Mar. 10, 1936 |
| 2,037,666 | Pennington | Apr. 14, 1936 |
| 2,079,173 | Judd | May 4, 1937 |
| 2,178,953 | Chilton | Nov. 7, 1939 |
| 2,221,470 | Brown | Nov. 12, 1940 |
| 2,275,712 | Zand | Mar. 10, 1942 |
| 2,305,433 | Kyle | Dec. 15, 1942 |
| 2,321,340 | Waterbury | June 8, 1943 |
| 2,324,880 | Rogers et al. | July 20, 1943 |
| 2,347,773 | Franz | May 2, 1944 |
| 2,444,394 | Arnold | June 29, 1948 |
| 2,449,512 | Schuer | Sept. 14, 1948 |
| 2,570,259 | McKinley | Oct. 9, 1951 |
| 2,578,730 | Nicholson et al. | Dec. 18, 1951 |
| 2,638,930 | Barr | May 19, 1953 |
| 2,678,065 | Crookston | May 11, 1954 |
| 2,725,078 | Glancy | Nov. 29, 1955 |
| 2,766,161 | Hagopian et al. | Oct. 9, 1956 |
| 2,768,106 | Sartakoff | Oct. 23, 1956 |
| 2,792,593 | Hardgrove | May 21, 1957 |
| 2,814,074 | Butzko | Nov. 26, 1957 |
| 2,829,401 | Mercier | Apr. 8, 1958 |
| 2,849,026 | Taplin | Aug. 26, 1958 |
| 2,874,458 | Smith | Feb. 24, 1959 |
| 2,901,242 | Elliot et al. | Aug. 25, 1959 |